April 30, 1946.  H. J. WEBB  2,399,412
CIRCUIT INTERRUPTER
Filed July 15, 1943  5 Sheets-Sheet 3

WITNESSES:

INVENTOR
Herbert J. Webb.
BY
ATTORNEY

April 30, 1946. H. J. WEBB 2,399,412
CIRCUIT INTERRUPTER
Filed July 15, 1943 5 Sheets-Sheet 5

WITNESSES:

INVENTOR
Herbert J. Webb.
BY
Ralph H Swingle
ATTORNEY

Patented Apr. 30, 1946

2,399,412

UNITED STATES PATENT OFFICE 2,399,412

CIRCUIT INTERRUPTER

Herbert J. Webb, Forest Hills, Pa., assignor to Westinghouse Electric Corporation, East Pittsburgh, Pa., a corporation of Pennsylvania Application July 15, 1943, Serial No. 494,818

15 Claims. (Cl. 200—148)

This invention relates to circuit interrupters of the gas blast type, and more particularly, to improved arc extinguishing structures therefor.

It is an object of my invention to provide a circuit interrupter with a gas blast arc extinguisher of the orifice type, making use of the principles of gas flow through an orifice to obtain maximum velocity of flow to deionize the arc, and at the same time to keep the gas pressure in the arc region as high as possible to take advantage of the higher dielectric strength and higher break-down voltage of gas at increased pressure.

Considering the flow of gas through an orifice it is known that increasing the entrance pressure of the orifice with respect to the exhaust pressure of the orifice (or decreasing the exhaust pressure of the orifice with respect to the entrance pressure of the orifice) will increase the velocity of the gas through the orifice until a velocity limit for the gas flow through the orifice is reached. When this velocity limit is reached, a further increase of the gas pressure drop through the orifice will not result in any further increase of the gas velocity through the orifice. This velocity limit is the velocity of sound in the particular gas at the density and temperature of the gas present within the orifice. The principles of gas flow through an orifice are set forth on pp. 146, 147 in the 3rd edition of G. A. Goodenough "Principles of Thermodynamics" (1920). It is there set forth that the limiting velocity for the gas flow through the orifice, that is acoustic velocity through the orifice, is reached when $$\frac{P|}{P_1} = \left(\frac{2}{K+1}\right)\frac{K}{K-1} \quad (1)$$

where P is the pressure of the gas on the exhaust side of the orifice, $P_1$ is the pressure of the gas on the entrance side of the orifice, and K, the gas constant for the particular gas used, is determined by the following relation:

$$K = \frac{C_P}{C_v}$$

where $C_P$ is the specific heat of the particular gas at constant pressure, and $C_v$ is the specific heat of the gas at constant volume.

For air, K=1.4, and Equation 1 when evaluated for air becomes $$\frac{P}{P_1} = 0.53$$

This means that when the quotient of the exhaust pressure of the orifice divided by the entrance pressure of the orifice is equal to or less than 0.53, considering air as the applicable gas, then the compressed air will flow through the orifice at acoustic velocity. If the quotient of the exhaust pressure of the orifice divided by the entrance pressure of the orifice varies from 0.53 to 1.0 the velocity of the compressed air flow through the orifice will correspondingly decrease from acoustic velocity to zero. The quotient 1 is obtained when $P=P_1$ and hence there is no gas pressure drop through the orifice to cause any gas velocity through the orifice. The gas velocity is, therefore, zero, when the quotient is 1.0.

Since air is most commonly used in compressed gas circuit interrupters, I describe my invention as applied to a compressed air circuit interrupter where K=1.4 and hence the critical velocity Equation 1 becomes $$\frac{P}{P_1} = 0.53$$

It is to be understood, however, that I use air only as an example, my invention being readily applicable to other arc extinguishing gases such as carbon dioxide, nitrogen, hydrogen, oxygen, etc., where K would have a different value and where the critical quotient of exhaust pressure divided by entrance pressure would have a different value than 0.53.

Since the maximum air velocity through the orifice is obtained when $$\frac{P}{P_1} = 0.53$$

it is an object of my invention to maintain a high exhaust pressure for the orifice in order to provide high dielectric strength to prevent reignition of the arc, yet to maintain the quotient of $$\frac{P}{P_1}$$

sufficiently low to insure an air velocity through the orifice near accoustic velocity. I also prefer to expand this concept by employing two or more orifices, through which an arc may be drawn. I make the pressure drops through the orifices such that the gas velocity through each orifice is near accoustic velocity, yet the pressure between successive orifices is maintained high for high dielectric strength of the gas. Preferably I maintain the exhaust pressure for the last orifice above atmospheric pressure to obtain increased dielectric strength adjacent the stationary contact. This will insure that the air adjacent the stationary contact will have a high-voltage breakdown value, above that of atmospheric air because of the increased pressure, to minimize the possibility of reignition.

Another object is to provide an improved arc extinguishing structure in which the compressed gas is successively expanded adjacent the drawn arc to facilitate the extinction thereof.

Another object is to provide an improved circuit interrupter of the gas blast type in which are disposed a plurality of orifices, through which the established arc is drawn. I proportion the cross-sectional areas of the successive orifices so that the gas pressure drops through the successive orifices are sufficient to result in the gas passing through the successive orifices at a velocity near acoustic velocity.

Another object is to provide an improved arc extinguishing structure employing a plurality of orifices of progressively widening cross-sectional area through which the established arc is drawn. Preferably I dispose valve means intermediate adjacent orifices to prevent the arcing pressure from distorting the desired pressure drops through the orifices.

Further objects and advantages will readily become apparent upon a reading of the following specification, taken in conjunction with the drawings, in which.

Figure 1:
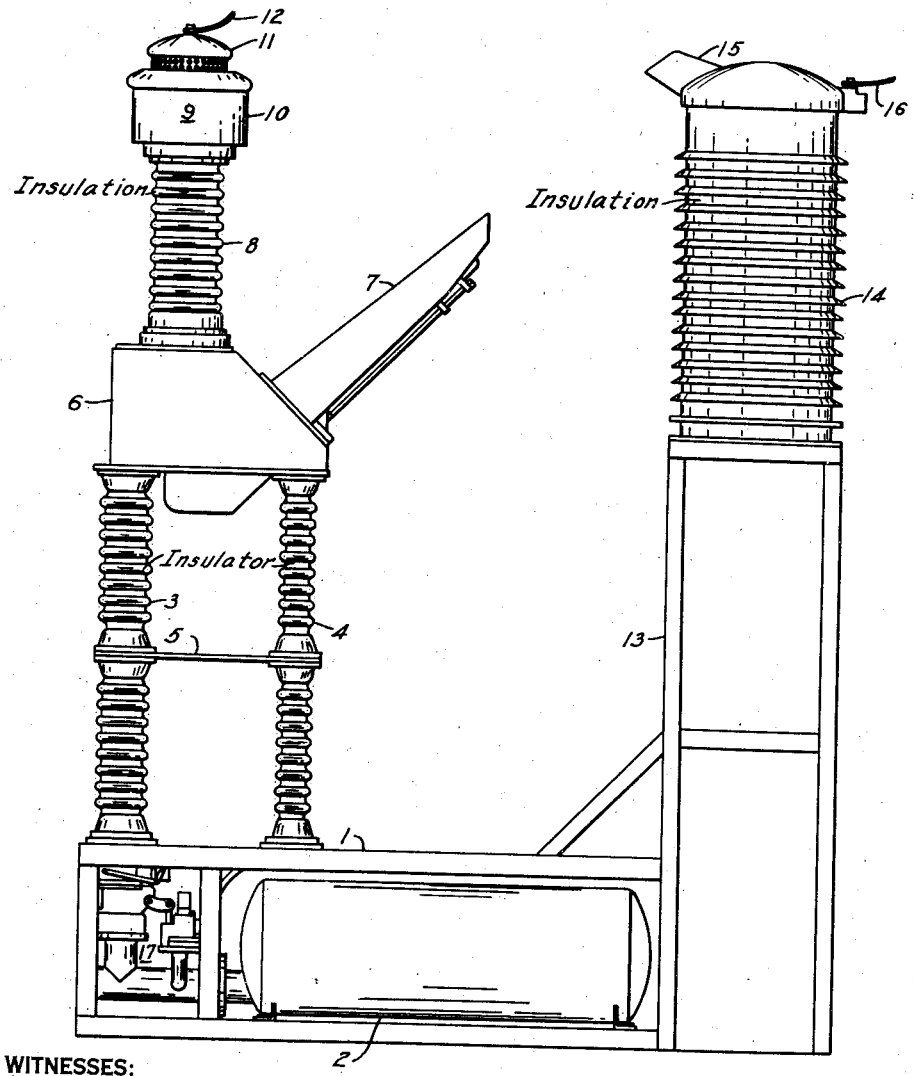
Figure 1 is an elevational view of a circuit interrupter embodying my invention and shown in the open circuit position.

Referring to the drawings, and more particularly to Fig. 1, the reference numeral 1 designates a suitable framework supporting a tank 2 of compressed fluid, in this instance compressed air. The framework 1 also supports tubular insulators 3, 4 connected by a brace 5 and supporting a metallic housing 6 for the operating mechanism of the interrupter. The housing 6 supports a weather-proof hood 7 which encloses the movable disconnect contact not shown. The housing 6 also supports a tubular insulator 8, at the upper end of which is secured an arc extinguishing device, generally designated by the reference numeral 9. The arc extinguishing device 9 is provided with a suitably vented insulating enclosure 10 at the top of which is positioned a perforated cap 11 through which extends the line terminal 12.

The framework 1 also carries a support frame 13 which supports an insulating housing 14, the latter enclosing a current transformer or other metering equipment connected serially into the circuit. At the top of the insulating housing 14 is disposed the stationary disconnect contacts 15 and the other line terminal 16 of the interrupter. Disposed at the lower end of the framework 1, adjacent the tank of compressed air 2, are electrically actuated valves, generally designated by the reference numeral 17. The valves 17 may be operated manually or in response to overload conditions in the circuit controlled by the interrupter.

Briefly, the valves 17 serve to send a blast of fluid from the tank 2 upward through the tubular insulator 3, through the tubular insulator 8 to effect extinction of the arc drawn in the arc extinguishing device 9. Following the extinction of the arc drawn in the arc extinguishing device 9 the valves 17 also operate to send a blast of fluid upward through the tubular insulator 4 to actuate the disconnect mechanism enclosed within the housing 6. The actuation of the disconnect mechanism serves to withdraw the movable disconnect contact, not shown, from the stationary disconnect contacts 15 to effect an isolating gap in the circuit.

To close the electrical circuit through the interrupter the valves 17 are actuated to successively send a blast of fluid through the tubular insulators 3, 4 to actuate the mechanism enclosed in the housing 6. This actuation of the mechanism within the housing 6 serves to first close the contact structure within the arc extinguishing device 9, and subsequently to close the disconnect contacts. In the closed circuit position of the interrupter, not shown, the electrical circuit therethrough briefly comprises the line terminal 12, arc extinguishing device 9, movable disconnect contact not shown, stationary disconnect contacts 15, current transformer not shown, to line terminal 16.

Figure 2:
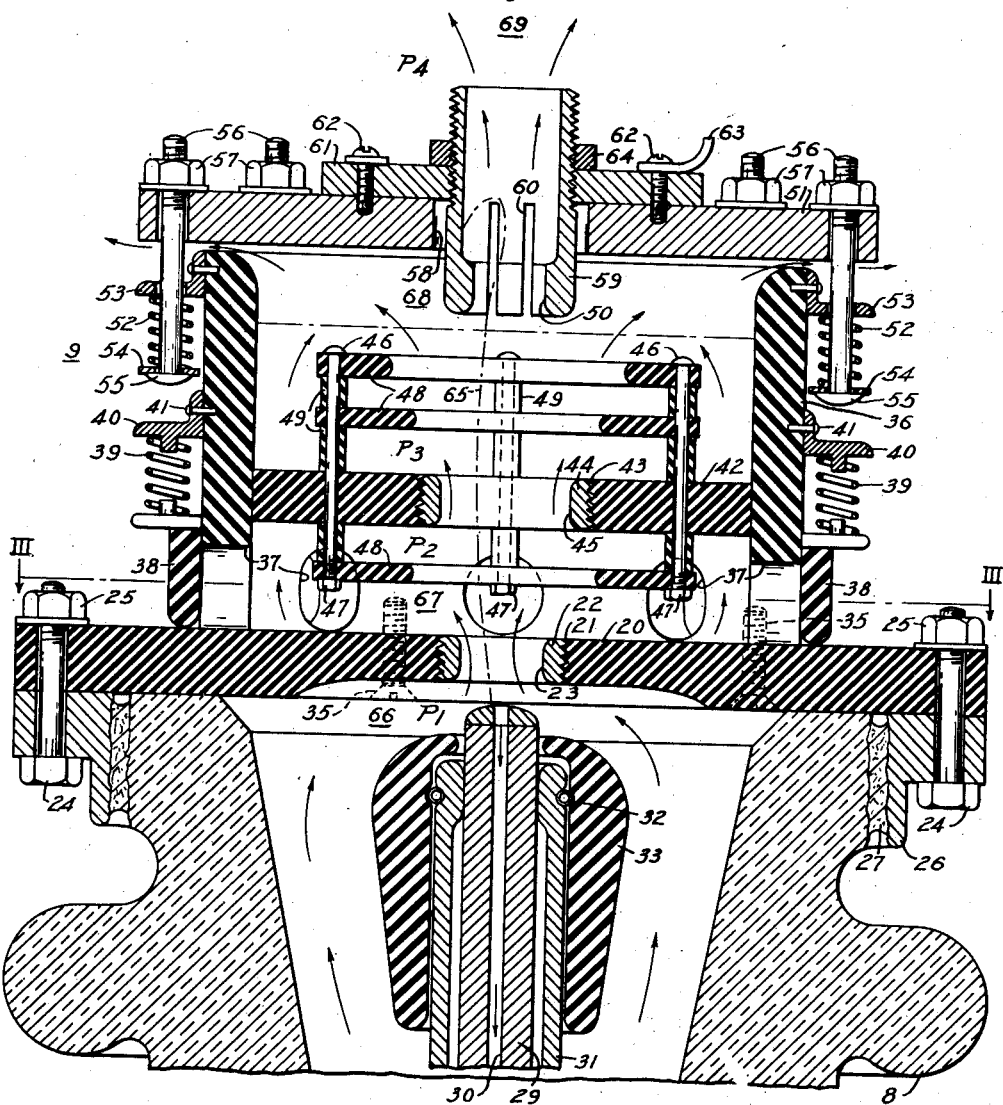
Fig. 2 is an enlarged view in vertical cross-section of only the arc extinguishing device of Fig. 1 with the enclosure 10 omitted, and showing the disposition of the parts during a circuit opening operation.
Figure 3:
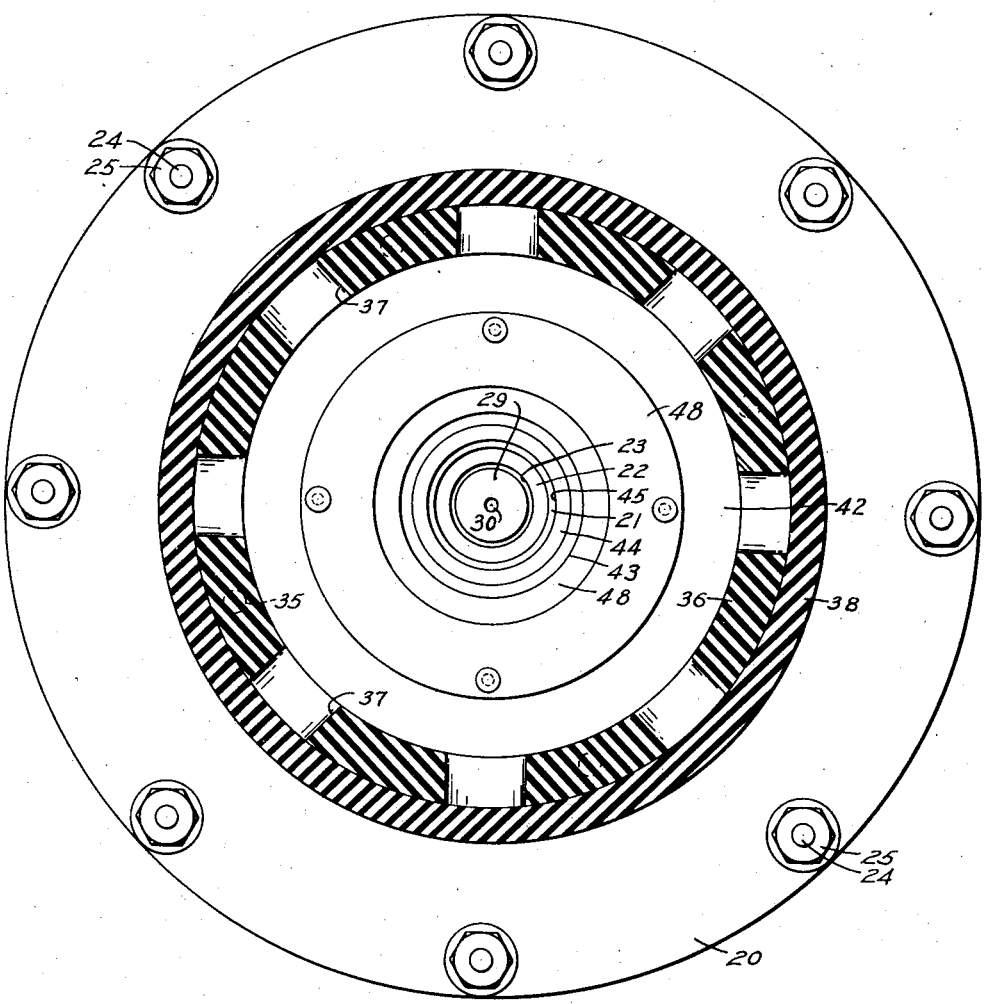
Fig. 3 is a view in cross-section taken on the line III—III of Fig. 2.

Referring more particularly to Fig. 2, which shows in vertical section the arc extinguishing device 9 of Fig. 1, with the enclosure 10 and cap 11 omitted for purposes of clarity, it will be observed that an insulating plate 20 rests on the top of the tubular insulator 8. The plate 20 has an aperture 21 formed therein in which is threadedly secured a metallic insert 22 which defines a first orifice 23. The insulating plate 20 is secured by bolts 24 and nuts 25 to an annular flange 26, the latter being secured as by cement 27 to the tubular insulator 8.

Operating within the tubular insulator 8 and axially thereof is a sliding tubular movable bridging contact 29 having an axial passage 30 therethrough. The bridging contact 29 slides within a conducting cylinder 31, the upper end of which is slotted to be resilient, being biased radially inwardly into contacting engagement with the bridging contact 29 by an annular tension spring 32. An insulating flow director 33 surrounds the upper portion of the cylinder 31 and serves to direct the compressed air to flow radially inward toward the first orifice 23.

Secured, as by the screws 35 to the plate 20, is an insulating cylinder 36 in which are formed a plurality of vents 37. The vents 37 are normally closed by an annular valve 38 which is biased downwardly against the plate 20 by compression springs 39, thus closing the vents 37. The compression springs 39 have offstanding brackets 40 as their upper seats, the brackets 40 being secured by pins 41 to the insulating cylinder 36. An annular insulating plate 42 is disposed within the cylinder 36, and is provided with an aperture 43 in which is threadedly secured a metallic insert 44 which defines a second orifice 45. Insulating bolts 46 extend through the insulating plate 42 and with nuts 47 and insulating sleeves 49 maintain in spaced relation a plurality, in this instance three, insulating baffle rings 48, the purpose of which will appear more fully hereinafter.

A conducting valve plate 51 closes the upper end of the cylinder 36 and is biased downwardly by compression springs 52. The compression springs 52 are disposed between brackets 53 and washers 54, the latter being supported by the heads 55 of bolts 56. Nuts 57 serve to provide the proper tension in the compression springs 52. The valve plate 51 has an aperture 58 formed therein, through which extends a tubular stationary contact 59, the latter being slotted as at 60 to be resilient. The tubular stationary contact 59 is threadedly secured to a metallic support plate 61, the latter being secured by the screws 62 to the conducting plate 51. One of the screws 62 also carries a flexible conductor 63, the upper end of which is electrically connected to the line terminal 12. A lock nut 64 is threaded to the tubular stationary contact 59 and serves to maintain the latter in the desired position.

When the tubular movable bridging contact 29 is moved downwardly by the operating mechanism disposed in the housing 6, an arc is drawn which is designated by the reference numeral 65 in Fig. 2. It will be observed that the arc 65 is drawn through the second orifice 45 and also through the first orifice 23. Meanwhile, compressed gas, in this instance air, is forced upwardly through the tubular insulator 8 and directed by the plate 20 and flow director 33 radially inwardly toward the arc 65, and through the first orifice 23 as indicated by the arrows in Fig. 2. The insulating baffle rings 48 prevent the arc 65 from bowing too far outwardly from the first and second orifices. By providing the baffle rings 48 the arc 65 is maintained substantially axially of the arc extinguishing device 9. Thus the deionizing activity of the gas blast is used most effectively. The metallic inserts 22 and 44 are provided to prevent too severe errosion of the orifices 23, 45 which would result if insulating material defined the orifices 23, 45.

Preferably, I make the cross-sectional areas through the first orifice 23 and the second orifice 45 such that the pressure drops through the first and second orifices 23, 45 are sufficient so that the compressed air passes through these two orifices substantially at or in neighborhood of acoustic velocity. In other words the pressure $P_1$ in the entrance region 66 below the first orifice 23 is related to the pressure $P_2$ in the exhaust region 67 so that, $$\frac{P_2}{P_1} = 0.53$$

As a result, the compressed air will pass at near acoustic velocity through the first orifice 23. The cross-sectional area of the second orifice 45 is preferably substantially twice the cross-sectional area of the first orifice 23. This, together with the normal raising of the plate 51, causes the pressure $P_3$ in the exhaust region 68 to be related to the pressure $P_2$ in the region 67 such that, $$\frac{P_3}{P_2} = 0.53$$

Consequently, the compressed air will pass at near acoustic velocity through the second orifice 45.

The spring-biased plate 51 coacting with cylinder 36 maintains the pressure $P_3$ in the region 68 at the desired pressure by dumping excess pressure beneath the plate 51 to atmosphere as shown by the arrows in Fig. 2. During normal operation, the plate 51 is somewhat raised above the cylinder 36 by the air pressure as shown in Fig. 2. The vent 50 through the tubular stationary contact 59 is used to insure the positioning of the upper terminal of the arc 65 within the tubular contact 59 as clearly shown in Fig. 2. This helps to center the arc 65, and to prevent ionized particles entering the arcing region.

If, for example, the pressure within the entrance region 66 is 300 pounds per square inch, then preferably $P_2$ is made about 159 pounds per square inch and $P_3$ is made about 84.5 pounds per square inch, atmospheric pressure or 15 pounds per square inch existing at $P_4$ in the region 69 above the stationary contact 59. The above pressures are absolute pressures not gauge pressures.

To prevent the arcing pressure from distorting the above desired values of $P_1$, $P_2$ and $P_3$ the annular valve 38 and the spring-biased plate 51 are provided. Thus when the pressure $P_2$ exceeds the desired value the annular valve 38 will raise to permit compressed air to pass outwardly through the vents 37 until the pressure $P_2$ drops to the desired value. Likewise, should the arcing pressure cause the pressure $P_3$ to raise above the desired value, the plate 51 will raise still farther than normally to permit compressed air to pass out of the cylinder 36 beneath the plate 51.

Although the above values are desirable, my invention is operable at other values. For example, although I prefer to have the pressure drops through the first and second orifices 23, 45 such that the compressed air passes with acoustic velocity through these two orifices, nevertheless if the velocity of the gas through the respective orifices is between 0.6 and 1.0 times the acoustic velocity through the respective orifices good performance of the interrupter is obtained. A more limited and preferred range of velocity through the respective orifices is between 0.8 and 1.0 times the acoustic velocity. I have found it desirable to maintain the gas velocity through the first and second orifices as close to acoustic velocity as possible.

It is to be noted that when the term "acoustic velocity" is used herein and in the appended claims it means a velocity near the velocity of sound in the gas at the density and temperature which are present within the particular orifice. Obviously, since the density of the gas decreases through the widening orifices the numerical value of the acoustic velocity through these orifices will decrease.

From the above description it will be apparent that I have provided a novel arc extinguishing device 9 in which are disposed two orifices through which the arc 65 is drawn. It will be observed that the compressed gas which is exhausted through the first orifice 23 is readily expanded through the second orifice 45 to utilize fully the deionizing potentialities of the gas. As stated previously, the pressure drops through the first orifice 23 and through the second orifice 45 are regulated by the size of the cross-sectional areas through the respective orifices and the spring-biased plate 51 so that the gas blast passing therethrough attains in the neighborhood of its maximum velocity, that is acoustic velocity. Extinction of the arc 65 is thereby readily effected.

It will also be observed that I have maintained the pressure of the gas at $P_3$ in the region 68 above atmospheric pressure. In the example given above, the pressure in this region is about 84.5 pounds per square inch, whereas atmospheric pressure or $P_4$ in the region 69 is 15 pounds per square inch. This high pressure at $P_3$ gives a high voltage breakdown value of the gas in the region 68 adjacent the stationary contact 59 because of its increased dielectric strength to minimize reignition.

If the pressure at $P_3$ were reduced to atmospheric pressure, by the omission of the valve plate 51, still there would be no greater gas velocity through the second orifice 45 and also the dielectric strength of the gas in region 68 would be greatly reduced. This follows because with $P_3=84.5$ and $P_2=159$ the quotient $$\frac{P_3}{P_2}=\frac{84.5}{159}=0.53$$

the value necessary for the air to flow through the second orifice 45 at acoustic velocity. Thus, with the construction I have shown, the dielectric strength of the gas in region 68 is much higher than the dielectric strength of gas at atmospheric pressure and still there is no decrease of gas velocity through the orifice 45.

Figure 4:
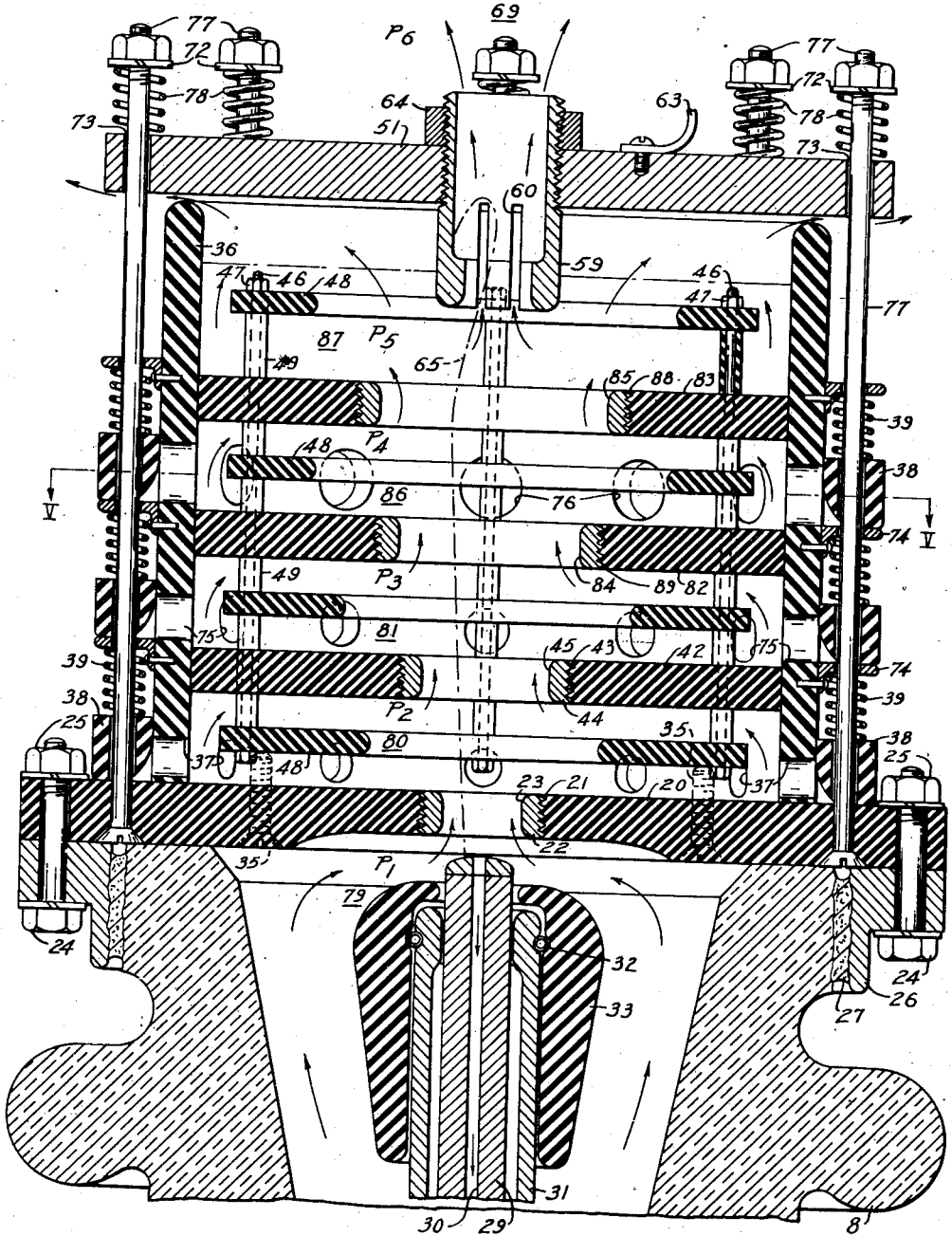
Fig. 4 is an enlarged view in vertical cross-section of a modified type of arc extinguishing device, the parts being shown during a circuit opening operation.
Figure 5:
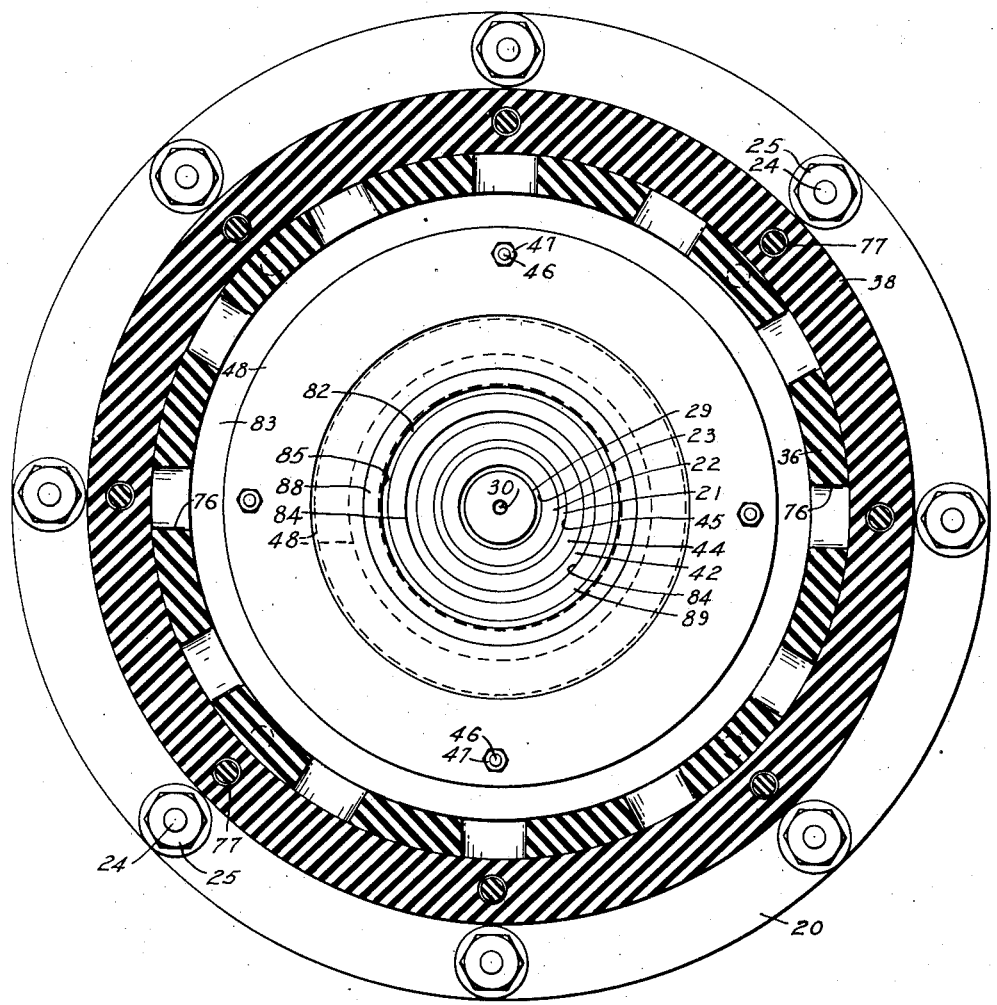
Fig. 5 is a plan view in cross-section taken on the line V—V of Fig. 4.

In the embodiment of my invention shown in Figs. 4 and 5 similar reference numerals have been used to designate like parts which function in substantially the same way as the parts shown in Fig. 2. It will be observed, however, that the insulating cylinder 36 is provided with a plurality of vents 75 disposed between the insulating plates 42, 82 and a plurality of vents 76 disposed between the plates 82 and 83, the purpose for which will appear more clearly hereinafter. The annular valves 38, which are biased downwardly against annular brackets 74, serve to close the vents 75 and 76. As in the construction shown in Fig. 2, an annular valve 38 is biased downwardly by compression springs 39 against the plate 29 to close the vents 37. The annular valves 38 are slidably supported on insulating rods 77, the upper ends of which extend through apertures 73 provided in the conducting plate 51. Compression springs 78, disposed between the plate 51 and washers 72 mounted on the rods 77, serve to bias the plate 51 downwardly.

The embodiment of my invention shown in Figs. 4 and 5 functions in a manner similar to the functioning of the embodiment shown in Fig. 2. It will be observed that the insulating plates 82 and 83 are provided with metallic inserts 88, 89 to form a third orifice 84 and a fourth orifice 85. The cross-sectional areas of the orifices 23, 45, 84 and 85 are so proportioned to cause the desired pressure drops through these orifices. The size of the orifice 85, together with the proper tensioning of the valve plate 51, produces the desired pressure $P_5$ in the region 87. Normally the valve plate 51 is raised to maintain the pressure $P_5=0.53\ P_4$ as indicated in Fig. 4.

During the interrupting operation, the arcing pressure, created by the arc 65, will tend to distort the desired pressure drops through the orifice 23, 45, 84 and 85. In this event, the valves 38, which are normally closed, will raise to dump the excess pressure. The arcing pressure in the region 87 may cause the valve plate 51 to raise farther than normal thus dumping the excess arcing pressure in the region 87.

An example of a desirable set of pressures are as follows: $P_1$, the pressure in the entrance region 79, is 300 pounds per square inch. $P_2$, the pressure in the exhaust region 80, is 159 pounds per square inch. $P_3$, the pressure in the exhaust region 81, is 84.5 pounds per square inch. $P_4$, the pressure for the exhaust region 86, is 45 pounds per square inch, and $P_5$, the pressure in the exhaust region 87, is 24 pounds per square inch, these all being absolute, not gauge, pressures. It will be observed that each pressure is 0.53 times the pressure of the immediately preceding region. Consequently, the compressed air passes at substantially acoustic velocity through all of the four orifices. However, it is not necessary that the gas blast pass at acoustic velocity through each orifice to obtain good results. A desirable range of velocity is between 0.6 to 1.0 times the acoustic velocity through the particular orifice being considered. A more desirable range is 0.8 to 1.0 times the acoustic velocity through the orifice. I have found it most desirable to have the velocity through the several orifices be very close to acoustic velocity.

It will be observed that in this embodiment of my invention, the pressure $P_5$ in the region 87 is above atmospheric pressure. That is, in the example given above, $P_5=24$ pounds per square inch. Since $P_5=24=0.53\times 45$, there is no decrease in the gas velocity through the fourth orifice 85 by having $P_5=24$, and there is an advantage in that there is an increase of dielectric strength in the region 87 over what it would be if only atmospheric pressure or 15 pounds per square inch existed in the region 87.

In the specific examples of desired pressures for the two embodiments of Fig. 2 and Fig. 4, it will be noted that the limiting velocities for the air flow through the several orifices are attained. That is, lowering the exhaust pressure for any orifice will not increase the gas velocity through that orifice. The exhaust pressure for the last orifice is preferably maintained above atmospheric pressure to secure high dielectric strength in the region adjacent the stationary contact 59 to minimize the possibility of reignition.

I have found that the quotient of the exhaust pressure for any orifice in the interrupters of Fig. 2 and Fig. 4 divided by the entrance pressure for that orifice should give a value which falls within the range from 0 to 0.82 to give good results. If the value of the quotient is between 0 and 0.53 acoustic velocity of the gas through the orifice is obtained. If the quotient is over 0.53, the velocity of the gas through the orifice will be less than acoustic velocity, until when the quotient is 0.82, the gas velocity through the orifice will be 0.6 times acoustic velocity. Gas velocities below this figure are not desirable. A more limited and preferred range for the above quotient is from 0 to 0.7. When the quotient varies from 0.53 to 0.7 the gas velocity is lowered from acoustic to 0.8 times acoustic velocity. A more preferred range is from 0.4 to 0.82. The range which I deem best is from 0.4 to 0.7.

In the two constructions which I show in the drawings, the cross-sectional areas of successive orifices are substantially in the ratio of 2:1. That is, considering the device shown in Fig. 4, the cross-sectional area of the second orifice is substantially twice that of the first orifice, the cross-sectional area of the third orifice being substantially twice that of the second orifice, and the cross-sectional area of the fourth orifice being substantially twice that of the third orifice. However, although best results are achieved by the orifice areas being in the ratio of substantially 2:1 taken in the direction of the gas blast, nevertheless good results are achieved if the quotient of the larger orifice divided by the smaller orifice falls in the range from 1 to 3. Best results are achieved, however, if the quotient of the cross-sectional area of the larger orifice divided by the cross-sectional area of the smaller orifice is in the range from 1½ to 2½. The preferred value of this quotient is substantially 2, and this is the construction which I show both in Fig. 2 and in Fig. 4, that is, the cross-sectional area of any orifice being substantially twice the cross-sectional area of the immediately preceding orifice.

It will be observed that in the double orifice arrangement shown in Fig. 2 and in the quadruple orifice arrangement shown in Fig. 4 that the desired pressures across the several orifices is maintained by a suitable design of the cross-sectional areas of the respective orifices and the tensioning of the valve plate 51. In other words, in both constructions shown the cross-sectional areas of the orifices serve by themselves together with the valve plate 51 to substantially maintain the desired pressure drops through the orifices, the annular valves 38 merely serving to vent excessive pressure between the orifices caused by the arcing pressure. However, it is to be clearly understood that although this is the preferable arrangement, nevertheless the scope of my invention is sufficiently broad to cover an arc extinguishing device in which the orifices are of different sizes and valves are provided between the orifices to obtain the desired pressure drops. The objection to the latter arrangement would be the loss of compressed gas passing through the valves, whereas in both arrangements shown in the drawings all of the gas is vented through the successive orifices adjacent the arc, and the valves 38 are merely used to vent excessive pressure between the orifices caused by the arcing pressure.

From the above description it will be apparent that I have disclosed a novel arc extinguishing device in which the compressed gas is successively expanded through a plurality of orifices adjacent the arc stream 65. The exhaust region for one orifice serves as the entrance region for the next successive orifice, and the cross-sectional areas of the successive orifices are such that the desired pressure drops through the orifices are maintained. Although I prefer to have the gas pass at substantially acoustic velocity through all the orifices certain limits of the velocity and pressures may be used with good results as indicated by the above ranges.

Although I have shown and described particular structures, it is to be clearly understood that the same were merely for purposes of illustration and that changes and modifications may readily be made by those skilled in the art without departing from the spirit and scope of the invention.

I claim as my invention:

1. In a circuit interrupter of the gas blast type, means forming a first orifice, means forming a second orifice, means for establishing arcing through both orifices, means for forcing a unidirectional flow of gas through both orifices at substantially acoustic velocity through both orifices, and valve means disposed between the two orifices to control the pressure therebetween.

2. In a circuit interrupter of the gas blast type, means forming a first orifice, means forming a second orifice, means for establishing arcing through both orifices, means for forcing a unidirectional flow of gas through both orifices with the gas attaining substantially acoustic velocity within at least one orifice, and valve means disposed between the two orifices to control the pressure therebetween.

3. In a circuit interrupter of the gas blast type, means forming a first orifice, means forming a second orifice, means for establishing arcing through both orifices, means for forcing a unidirectional flow of gas through both orifices with the gas attaining substantially a velocity within at least one orifice between 0.6 and 1.0 times the acoustic velocity, and valve means disposed between the two orifices to control the pressure therebetween.

4. In a circuit interrupter of the gas blast type, means forming a first orifice, means forming a second orifice, means for establishing arcing through both orifices, means for forcing a unidirectional flow of gas through both orifices with the gas attaining substantially a velocity within at least one orifice between 0.8 and 1.0 times the acoustic velocity, the exhaust pressure for the second orifice being above atmospheric pressure, and valve means disposed between the two orifices to control the pressure therebetween.

5. In a circuit interrupter of the fluid blast type, means forming a first orifice, means forming a second orifice, means for establishing arcing through both orifices, means for forcing fluid through the first orifice to exhaust through the second orifice, the quotient of the area of the second orifice divided by the area of the first orifice being from 1 to 3, and valve means disposed between the two orifices to control the pressure therebetween.

6. In a circuit interrupter of the fluid blast type, means forming a first orifice, means forming a second orifice, means for establishing arcing through both orifices, and means for forcing fluid through the first orifice to exhaust through the second orifice, the quotient of the area of the second orifice divided by the area of the first orifice being from 1½ to 2½.

7. In a circuit interrupter of the fluid blast type, means forming a first orifice, means forming a second orifice, means for establishing arcing through both orifices, means for forcing fluid through the first orifice to exhaust through the second orifice, the quotient of the exhaust pressure divided by the entrance pressure in at least one orifice being from 0 to 0.82, and valve means disposed between the two orifices to control the pressure therebetween.

8. In a circuit interrupter of the fluid blast type, means forming a first orifice, means forming a second orifice, means for establishing arcing through both orifices, means for forcing fluid through the first orifice to exhaust through the second orifice, the quotient of the exhaust pressure divided by the entrance pressure in at least one orifice being from 0 to 0.7, and valve means disposed between the two orifices to control the pressure therebetween.

9. In a circuit interrupter of the fluid blast type, means forming a first orifice, means forming a second orifice, means for establishing arcing through both orifices, means for forcing fluid through the first orifice to exhaust through the second orifice, the quotient of the exhaust pressure divided by the entrance pressure in both orifices being from 0 to 0.82, and valve means disposed between the two orifices to control the pressure therebetween.

10. In a circuit interrupter of the fluid blast type, means forming a first orifice, means forming a second orifice, means for establishing arcing through both orifices, means for forcing fluid through the first orifice to exhaust through the second orifice, the quotient of the exhaust pressure divided by the entrance pressure in both orifices being from 0 to 0.7, and valve means disposed between the two orifices to control the pressure therebetween.

11. In a circuit interrupter of the fluid blast type, means forming a first orifice, means forming a second orifice, means for establishing arcing through both orifices, means for forcing a unidirectional flow of fluid through both orifices at a velocity between 0.6 and 1.0 times the acoustic velocity, and valve means disposed between the two orifices to control the pressure therebetween.

12. In a circuit interrupter of the fluid blast type, means forming a first orifice, means forming a second orifice, means for establishing arcing through both orifices, means for forcing a unidirectional flow of fluid through both orifices at a velocity between 0.8 and 1.0 times the acoustic velocity, and valve means disposed between the two orifices to control the pressure therebetween.

13. In a circuit interrupter of the fluid blast type, means forming two or more orifices, means for establishing arcing through the two or more orifices, means for sending a blast of fluid through the orifices, and the orifices progressively increasing in cross-sectional area in the direction of the fluid blast.

14. In a circuit interrupter of the fluid blast type, means forming two or more orifices, means for establishing arcing through the two or more orifices, means for sending a unidirectional blast of fluid through the orifices, and valve means disposed between two orifices to control the pressure therebetween.

15. In a circuit interrupter of the gas blast type, means forming a plurality of orifices, relatively stationary contact means disposed at one end of the plurality of orifices, movable contact means separable from the stationary contact means through the orifices to draw an arc through the orifices, means for sending a blast of gas through the orifices toward the stationary contact means to extinguish the arc, and means for maintaining the pressure adjacent the stationary contact means above atmospheric pressure.

HERBERT J. WEBB.